(12) United States Patent
Ackmann et al.

(10) Patent No.: US 9,913,353 B1
(45) Date of Patent: Mar. 6, 2018

(54) LIGHTING CONTROL SYSTEM AND METHOD WITH BATTERY POWERED CONTROL DEVICES

(71) Applicant: Crestron Electronics, Inc., Rockleigh, NJ (US)

(72) Inventors: Evan Ackmann, Hoboken, NJ (US); Russikesh Kumar, Ridgewood, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 15/375,955

(22) Filed: Dec. 12, 2016

(51) Int. Cl.
| | |
|---|---|
| *H05B 37/02* | (2006.01) |
| *H04L 12/28* | (2006.01) |
| *H05B 33/08* | (2006.01) |
| *G08B 21/18* | (2006.01) |

(52) U.S. Cl.
CPC ..... *H05B 37/0272* (2013.01); *H04L 12/2816* (2013.01); *H05B 33/0854* (2013.01); *H05B 37/0218* (2013.01); *H05B 37/0227* (2013.01); *G08B 21/182* (2013.01)

(58) Field of Classification Search
CPC ............ H05B 37/0272; H05B 37/0227; H05B 37/0281; H05B 33/0872; H05B 37/0218; H05B 33/0854; H04L 12/282; H04L 2012/2841; H04L 12/2816; Y02B 60/34; Y02B 20/44; Y02B 20/48; Y02B 60/50; H02J 50/40; H02J 50/23; H04W 4/008

USPC .................................. 315/297, 307, 312, 362
See application file for complete search history.

(56) References Cited

U.S. PATENT DOCUMENTS

| | | | |
|---|---|---|---|
| 6,870,329 B2 | 3/2005 | Krieger et al. | |
| 7,824,061 B1 | 11/2010 | Riedfort et al. | |
| 8,228,184 B2 | 7/2012 | Blakeley et al. | |
| 8,232,745 B2 * | 7/2012 | Chemel | F21S 9/043 |
| | | | 315/291 |
| 9,655,217 B2 * | 5/2017 | Recker | H05B 37/0272 |
| 9,746,371 B1 * | 8/2017 | Kumar | G01J 1/44 |
| 2017/0288468 A1 * | 10/2017 | Pearson | H02J 50/90 |

* cited by examiner

*Primary Examiner* — Haissa Philogene
(74) *Attorney, Agent, or Firm* — Crestron Electronics, Inc (57) ABSTRACT

A lighting control system for operating lighting in a room is provided. The lighting control system may comprise a load controller, sensors, and battery powered lighting control devices, such as switches, dimmers, and/or keypads. The load controller is configured for controlling the operation of a lighting load in response to messages received from the lighting control devices and sensors over a wireless network. The battery operated lighting control device is configured for detecting a low battery level, transmitting a low battery message to the load controller, and entering into a low battery mode during which it ceases transmitting any messages to the load controller until the battery is replaced. In response to the low battery message received from at least one lighting control device, the load controller is configured for entering into a low battery mode during which it maintains the lighting load turned on. The load controller is configured for exiting the low battery mode and resuming normal operation upon receipt of a subsequent message from the at least one lighting control device.

29 Claims, 5 Drawing Sheets

LIGHTING CONTROL SYSTEM AND METHOD WITH BATTERY POWERED CONTROL DEVICES

BACKGROUND OF THE INVENTION

Technical Field

Aspects of the embodiments relate to building control systems, and more specifically to a lighting control system and method with battery powered control devices.

Background Art

The field of home automation is rapidly developing. The ability to control electrical fixtures, appliances, and electronics remotely is becoming more and more common place. Wall mounted switching devices, such as light switches and dimmers, are typically placed inside a junction box or a mounting fixture. In commercial construction, metal wall boxes are often used. These switching devices typically include control circuitry and processors powered by internal power supplies that derive power from high voltage wiring, which is typically 120 Volts alternating current (VAC) in the United States.

In today's fast paced environment, space dynamics often change and require simple and easy to install lighting systems. In such applications, battery powered devices, such as wall light switches and dimmers, are ideal because they do not require existing junction boxes or wires. Yet, battery powered devices eventually die no matter how long their batteries last. For systems that rely on such buttery powered devices this can pose a problem as the devices may not have a meaningful interface to show that the batteries have gone dead. This problem is compounded in local room control systems that may not utilize a centralized system control with means to alert users that battery control devices have died. The major downside is when a battery powered device dies, which provides the only way to controls lights in the room, an end user may be left in a scenario where there is no way to turn the lights back on.

Accordingly, a need has arisen for a lighting control system with battery powered control devices that operates in a low battery mode.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a building control system that will obviate or minimize problems of the type previously described.

More particularly, it is an aspect of the embodiments to provide systems, methods, and modes for a lighting control system with battery powered control devices that operates in a low battery mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to a first aspect of the embodiments, a lighting control system installed in a room is provided. The lighting control system comprises at least one battery powered lighting control device and a load controller connected to a power source and to a lighting load and configured for controlling an operation of the lighting load. The at least one lighting control device comprises a user interface configured for receiving control commands from a user; a wireless network interface configured for transmitting messages over a wireless network; and at least one processor comprising a memory encoding one or more processor executable instructions, which when executed by the at least one processor, cause acts to be performed comprising: (i) detecting a low battery level, (ii) transmitting a low battery message, and (iii) entering into a low battery mode during which the at least one lighting control device ceases transmitting any messages until the battery is replaced. The load controller comprises a wireless network interface configured for wireless communication over the wireless network; and at least one processor comprising a memory encoding one or more processor executable instructions, which when executed by the at least one processor, cause acts to be performed comprising: (i) receiving the low battery message from the at least one lighting control device, (ii) entering into a low battery mode during which the load controller maintains the lighting load turned on, and (iii) exiting the low battery mode and resuming normal operation upon receipt of a message from at least one lighting control device.

According to an embodiment, the load controller is hard wired to the power source and to the lighting load. The load controller may comprise a receptacle for receiving a plug of the lighting load. The load controller may further comprise a switch configured for switching the lighting load on or off. The switch may comprise an electromechanical relay, a solid-state relay, or a combination thereof. The load controller may comprise a dimmer configured for providing a dimmer voltage output to the lighting load.

According to an embodiment, the low battery level may be detected by reading a battery voltage level of the battery and determining whether the battery voltage level is below a predetermined low battery threshold. The low battery threshold may comprise a value that exceeds a voltage level required for at least one wireless transmission over the wireless network. According to an embodiment, during the low battery mode of the lighting control device, the at least one lighting control device shuts down. According to another embodiment, during the low battery mode of the lighting control device, the at least one lighting control device disables one or more of its operations such that it cannot transmit messages to the load controller. According to an embodiment, during the low battery mode of the lighting control device, the at least one lighting control device turns off its wireless network interface. According to another embodiment, during the low battery mode of the lighting control device, the at least one lighting control device turns off its user interface. According to yet another embodiment, during the low battery mode of the lighting control device, the at least one processor of the at least one lighting control device does not initiate any messages to the load controller.

According to an embodiment, the at least one lighting control device may comprise a status light indicator. During the low battery mode of the lighting control device, the at least one lighting control device may visually indicate via the light indicator that its battery level is low.

According to another embodiment, the lighting control system may further comprise at least one sensor, and during the low battery mode of the load controller, the load controller may ignore any messages from the at least one senor to turn the lights off. According to another embodiment, the lighting control system may comprise at least one daylight sensor configured for detecting and measuring light intensities in the room and transmitting the measured light intensities to the load controller, wherein during the low battery mode of the load controller the load controller ignores any message received from the daylight sensor. According to an embodiment, the load controller may be configured for operating in a daylighting mode by dimming its output to dim the lighting load based on sunlight levels reported by a daylight sensor, and during the low battery mode of the load controller, the load controller may exit the daylighting mode.

According to another embodiment, the lighting control system may further comprise an occupancy sensor configured for detecting an occupancy state of the room and transmitting a room occupied signal when the room is occupied and a room vacant signal when the room is vacant. According to an embodiment, during the low battery mode of the load controller, the load controller may ignore a room vacant signal received from the occupancy sensor. According to another embodiment, during the low battery mode of the load controller, upon receipt of the room occupied signal the load controller enters an occupancy low battery mode and sends a command to the occupancy sensor to operate in an occupancy mode, wherein during the occupancy low battery mode the load controller turns the lighting load on upon receiving the room occupied signal and turns the lighting load off upon receiving the room vacant signal.

According to another embodiment, the lighting control system may further comprises an occupancy sensor configured for detecting an occupancy state of the room, wherein the occupancy sensor is configured for operating in an occupancy mode or a vacancy mode, wherein during the occupancy mode the occupancy sensor transmits a room occupied action signal when the room becomes occupied and a room vacant signal when the room becomes vacant, wherein during the vacancy mode the occupancy sensor transmits a room occupied no action signal when the room becomes occupied and a room vacant signal when the room becomes vacant. During the normal operation of the load controller, the load controller may be configured to turn the lighting load on upon receipt of the room occupied action signal, turn the lighting load off upon receipt of the room vacant signal, and not change the operation of the lighting load upon receipt of the room occupied no action signal. During the low battery mode of the load controller, upon receipt of the room occupied action signal or the room occupied no action signal, the load controller may enter an occupancy low battery mode and send a command to the occupancy sensor to operate in an occupancy mode. Wherein in response to the command to operate in an occupancy mode, the occupancy sensor toggles to operate in the occupancy mode. During the low battery mode of the load controller, the load controller may ignore the room vacant signal received from the occupancy sensor. Furthermore, during the occupancy low battery mode, the load controller may be configured to turn the lighting load on upon receipt of the room occupied action signal, turn the lighting load off upon receipt of the room vacant signal, and not change the operation of the lighting load upon receipt of the room occupied no action signal. The load controller may exit the occupancy low battery mode and resume normal operation upon receipt of a message from the at least one lighting control device.

According to an embodiment, the message from the at least one lighting control device that causes the load controller to exit the low battery mode may comprise a message indicating to the load controller that there is a least one operational lighting control device. According to a further embodiment, the message from the at least one lighting control device that causes the load controller to exit the low battery mode may comprise a message indicating that the battery of the at least one lighting control device is no longer low, a control command, a request from the at least one lighting control device to rejoin the network, a confirmation that the at least one lighting control device has joined the network, or the like, or any combinations thereof. According to another embodiment, the at least one lighting control device may comprise a plurality of lighting control devices, wherein the load controller enters the low battery mode upon receiving the low battery message from one of the plurality of lighting control devices and exits the low battery mode upon receiving the message from any one of the plurality of control devices.

According to another aspect of the embodiments, a load controller installed in a room is provided. The load controller comprises a power supply connected to a power source; a switch connected to the lighting load; a wireless network interface configured for wireless communication over a wireless network with at least one battery powered lighting control device; and at least one processor. The at least one processor may comprise a memory encoding one or more processor executable instructions, which when executed by the at least one processor, cause acts to be performed comprising: (i) controlling an operation of the lighting load in response to receiving messages from the at least one lighting control device, (ii) receiving a low battery message from the at least one lighting control device indicating that the at least one lighting control device detected a low battery level, wherein the at least one lighting control device is configured for ceasing transmitting any messages to the load controller until its battery is replaced, (iii) entering into a low battery mode during which the load controller maintains the lighting load turned on, and (iv) exiting the low battery mode and resuming normal operation upon receipt of a message from the at least one lighting control device.

According to another aspect of the embodiments, a method of operation of a load controller is provided comprising the steps of: (i) controlling an operation of a lighting load in response to receiving messages from at least one battery operated lighting control device over a wireless network; (ii) receiving a low battery message from the at least one lighting control device indicating that the at least one lighting control device detected a low battery level, wherein the at least one lighting control device is configured for ceasing transmitting any messages to the load controller until its battery is replaced; (iii) entering into a low battery mode during which the load controller maintains the lighting load turned on; and (iv) exiting the low battery mode and resuming normal operation upon receipt of a message from the at least one lighting control device.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

100 Lighting Control System
101 Room
102 Load Controller
103 Battery Powered Lighting Control Device
104a-b Sensors
104a Occupancy Sensor
104b Daylight Sensor
105 Junction Box
106 Lighting Load
107 Buttons
108 Light Emitting Diode
110 Wireless Network
111 Wire Leads
112 Voltage Line
113 Load Line
201 Central Processing Unit
202 Wireless Network Interface
204 User Interface
207 Main Memory
208 Nonvolatile Memory
209 Status Light Indicator
210 Battery
301 Central Processing Unit
302 Wireless Network Interface
304 User Interface
307 Main Memory
308 Nonvolatile Memory
309 Status Light Indicator
311 Power Supply
312 Dimmer
313 Switch
400 Flowchart Illustrating an Operation of a Battery Powered Lighting Control Device When It's Battery Is Low
402-410 Steps of Flowchart 400
500 Flowchart Illustrating an Operation of a Load Controller in a Low Battery Mode
502-522 Steps of Flowchart 400

LIST OF ACRONYMS USED IN THE SPECIFICATION IN ALPHABETICAL ORDER

The following is a list of the acronyms used in the specification in alphabetical order.

AC Alternating Current
ASICs Application Specific Integrated Circuits
AV Audiovisual
CPU Central Processing Unit
GUI Graphic User Interface
HVAC Heating, Ventilation and Air Conditioning
Hz Hertz
ID Identification Number
LED Light Emitting Diode
PAN Personal Area Network
RAM Random-Access Memory
RF Radio Frequency
RISC Reduced Instruction Set
ROM Read-Only Memory
SSR Solid-State Relay
V Volt
VAC Volts Alternating Current
WPAN Wireless Personal Area Network

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics Inc., located in Rockleigh, N.J.

The different aspects of the embodiments described herein pertain to the context of building control systems, and more specifically to a lighting control system, but are not limited thereto, except as may be set forth expressly in the appended claims. The embodiments of the lighting control system can be used in small, mid, or large scale residential or commercial installations. While the embodiments are described herein as being implemented for commercial building management, they are not limited to such an implementation. The present embodiments may be employed in other type of venues or facilities, including in residential, retail, or nonprofit structures or venues. Additionally, the lighting control system described herein may be scaled up to manage and control an entire building or an entire campus of buildings or scaled down to manage a single room, a floor, or a section of a floor, such as a department. Additionally, while the lighting control system of the present embodiments is described below as monitoring and controlling lighting, the lighting control system can in addition monitor and control numerous other electronic devices, including one or more of heating, ventilation and air conditioning (HVAC), shading, security, appliances, door locks, and audiovisual (AV) equipment, among others.

The present embodiments provide a lighting control system with battery powered control devices that operates in a low battery mode. A battery powered control device may detect that it's battery is getting low and send out a message. The lighting control system interprets this message and enters into a low battery mode where it ensures that the lights remain on or can be turned back on. Accordingly, the lighting control system ensures that people are not left in the dark without any means to turn the lights back on.

Figure 1:
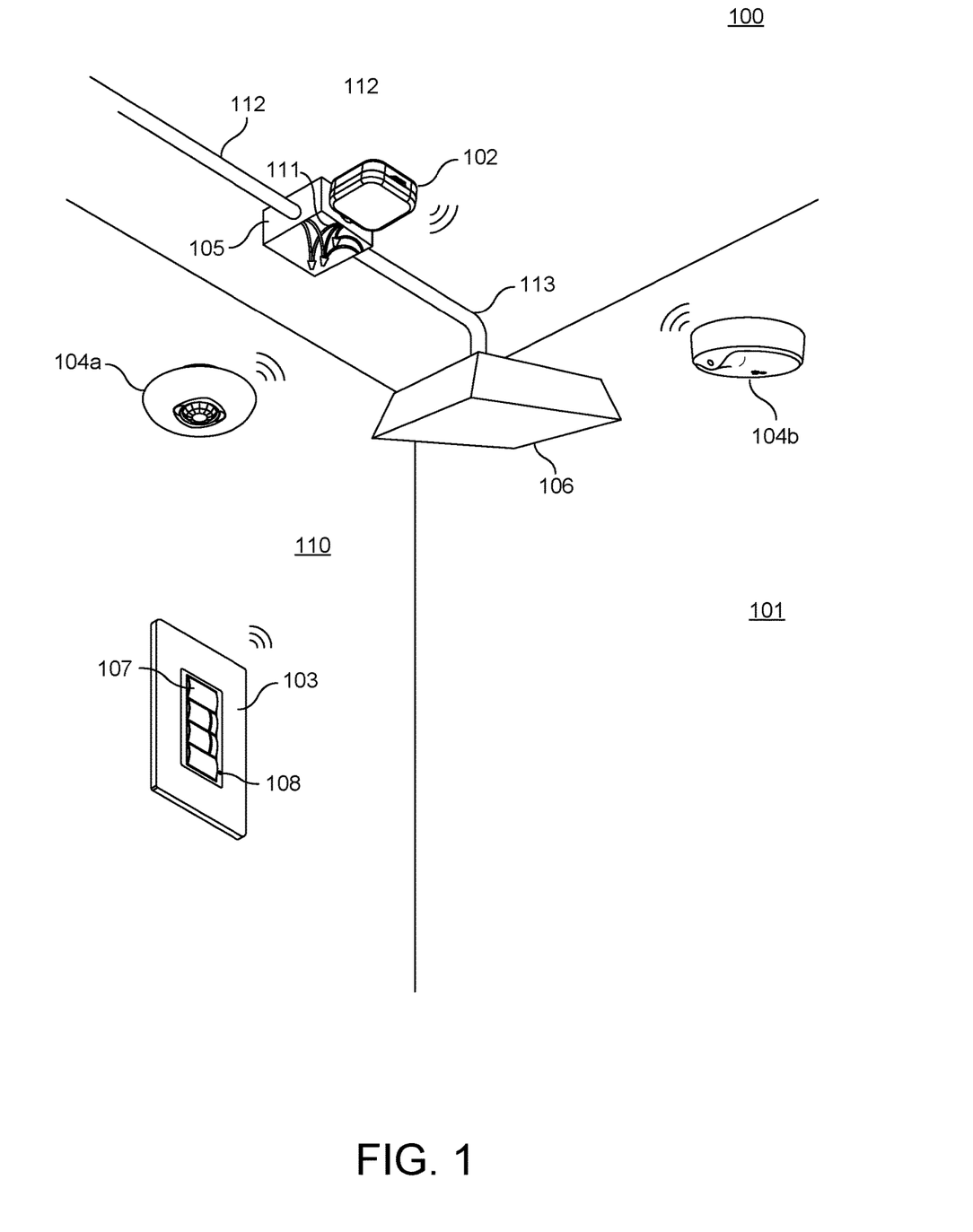
FIG. 1 illustrates a lighting control system according to an illustrative embodiment.

Referring to FIG. 1, there is shown a lighting control system 100 according to one embodiment. According to an embodiment, the lighting control system 100 can operate as a room-based, standalone system. Lighting control system 100 may be installed in a room 101 and may comprise the following devices: one or more load controllers 102, one or more battery powered lighting control devices 103, and one or more sensors 104a-b, such as an occupancy sensor 104a and a daylight sensor 104b. The lighting control system 100 may be installed in an office, classroom, conference room, residential room, or the like.

One or more battery powered lighting control devices 103 may be installed in room 101. Each battery powered lighting control device 103 of the present embodiments may be battery operated, for example, via a coin cell battery. As such, the battery powered lighting control device 103 may be attached to any vertical surface, such as a wall, such as glass, sheetrock, or the like, without the need of a junction box or wires. The battery powered lighting control device 103 may be installed to a junction box, or to a vertical surface using screws, adhesives, double sided adhesive tapes, or the like. In one embodiment, the battery powered lighting control device 103 may comprise similar configuration to the battery powered control device disclosed in U.S. patent application Ser. No. 15/342,639, filed Nov. 3, 2016, and titled "Battery Powered Keypad Assembly," the entire contents of which are hereby incorporated by reference.

The lighting control device 103 is configured to serve as a user interface to associated load controllers 102 in a space. In an illustrative embodiment, the lighting control device 103 may be configured to receive control commands directly from a user and transmit the control command to a load controller 102 electrically connected the lighting load 106 to control the lighting load 106 based on the control commands. The lighting control device 103 may comprise a wireless network interface configured for communicating with other in-room devices via an in-room wireless network 110. The lighting control device 103 may comprise a switch, a dimmer, a keypad, or another device configured for receiving control commands from a user. A light switch can be used to control the on/off state of the lighting load 106. A dimmer may be configured to control the on/off state of the lighting load 106 as well as to control a dimming level of the load 106. A keypad, such as the lighting control device 103 illustrated in FIG. 1, may comprise a plurality of buttons 107 configured to control multiple load devices, such as the lighting load 106, as well as other type of loads such as shade or drapery devices, HVAC systems, AV devices, or the like. In another embodiment, a keypad may comprise a plurality of buttons corresponding to different lighting scenes.

Figure 2:
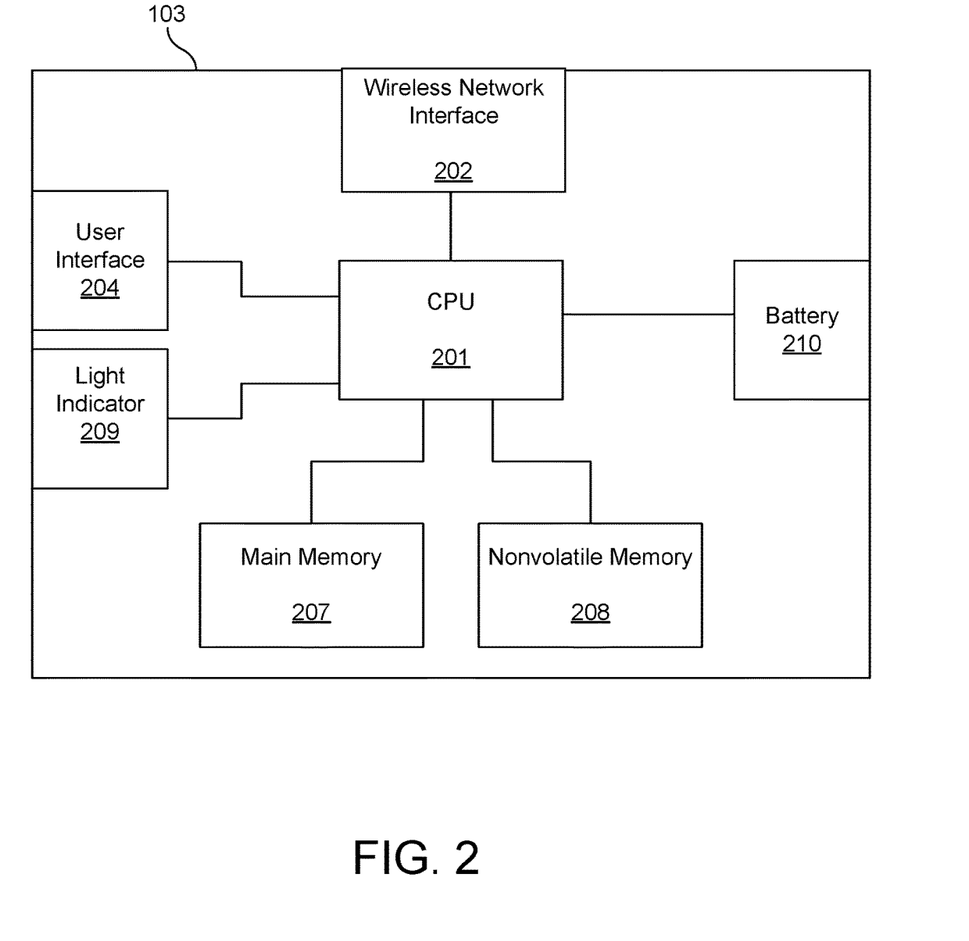
FIG. 2 illustrates a block diagram of a battery operated lighting control device according to an illustrative embodiment.

FIG. 2 is an illustrative block diagram of a battery operated lighting control device 103. The control device 103 may include various circuit components configured for receiving control commands and transmitting commands wirelessly to a load controller 102, or other in-room device. The lighting control device 103 may comprise a battery 210 configured for providing power to the various circuit components of the lighting control device 103. The battery 210 may comprise a BR2032 coin cell battery.

The lighting control device 103 may comprise a user interface 204, such one or more buttons 107 (FIG. 1) in communication with micro-switches or tactile switches, through which the lighting control device 103 may receive control commands from a user to control an operation of a load.

The lighting control device 103 may also comprise at least one status light indicator 209, such as a multicolored light emitting diode (LED) 108 (FIG. 1), configured for visually indicating the status of the lighting control device 103 to the user. For example, if a button 107 is pressed, the light indicator 209 may briefly light green. If the battery level is low (e.g., <5% life remaining) the light indicator 209 may blink red three times. The light indicator 209 may also indicate whether the control device 103 is trying to join a network, when it is configured, or the like. Additional status light indicators may also be provided, for example, to identify active switches or dimming levels.

Each lighting control device 103 can further comprise a central processing unit (CPU) 201. CPU 201 can represent one or more microprocessors, and the microprocessors can be "general purpose" microprocessors, a combination of general and special purpose microprocessors, or application specific integrated circuits (ASICs). Additionally, or alternatively, the CPU 201 can include one or more reduced instruction set (RISC) processors, video processors, or related chip sets. The CPU 201 can provide processing capability to execute an operating system, run various applications, and/or provide processing for one or more of the techniques and functions described herein. CPU 201 can process various commands and perform operations, such as allowing the lighting control device 103 to join the wireless network 110, receiving and processing user control commands, determining battery voltage levels and entering into a "Low Battery" mode as discussed below, or the like.

Each control device 103 can further include a main memory 207 and a nonvolatile memory 208. Main memory 207 can be communicably coupled to the CPU 201, which can store data and executable code. The main memory 207 can represent volatile memory such as random-access memory (RAM), but can also include nonvolatile memory, such as read-only memory (ROM) or Flash memory. In buffering or caching data related to operations of the CPU 201, the main memory 207 can store data associated with applications running on the control processor 201. The nonvolatile memory 208 can represent any suitable nonvolatile storage medium, such as a hard disk drive or nonvolatile memory, such as Flash memory. Being well-suited to long-term storage, the nonvolatile storage 208 can store data files, software for implementing the functions on the control processor 201, and wireless connection information to establish the wireless network 110.

Each lighting control device 103 may further comprise a wireless network interface 202 configured for bidirectional wireless communication with other electronic devices, such as the load controller 102, on the wireless network 110. The wireless network interface 202 may comprise a radio frequency (RF) transceiver configured for bidirectional wireless communication using wireless communication protocols, such as the ZigBee® protocol, the infiNET EX® protocol from Crestron Electronics, Inc. of Rockleigh, N.J., or the like.

Referring back to FIG. 1, lighting control system 100 may further comprise sensors 104a-b, including an occupancy sensor 104a and a daylight sensor 104b. Sensors 104a-b may be battery operated or may be connected to line voltage. Sensors 104a-b may comprise similar components as shown in FIG. 2, including a wireless network interface 202, a CPU 201, a main memory 207, and a nonvolatile memory 208. Sensors 104a-b may also comprise a user interface 204, such as one or more buttons, configured for commanding the sensors 104a-b to enter into a test mode, network joining mode, commissioning mode, or the like. Sensors 104a-b may further comprise light indicators 209, such as one or more LEDs, to display a status of the sensors 104a-b, for example to indicate when motion is detected, when a battery is low, or the like.

Sensors 104a-b may comprise an occupancy sensor 104a. Each occupancy sensor 104a can comprise a passive infrared element to detect motion. The infrared element may generate a signal based on sensed infrared radiation of the monitored area. The signal from the detector may be fed through low pass filters and into a window comparator. Motion will trigger the signal to move outside window comparator thresholds and generate an interrupt to wake the CPU of the sensor 104a. A Fresnel lens covers the infrared sensor for focusing the light to the infrared sensor. In addition, or alternatively, each occupancy sensor can comprise an ultrasonic sensor to detect motion. In an illustrative embodiment, occupancy sensor 104a may comprise similar configuration as the GLS-OIR-CSM-EX-BATT, Battery-Powered infiNET EX® Occupancy Sensor, available from Crestron Electronics, Inc. of Rockleigh, N.J.

An occupancy sensor 104a detects the occupancy state of a room in a building and generates an occupancy signal based on the occupancy state of that monitored area. For example, the occupancy sensor 104a can generate a binary signal with one logical level representing an occupied state and another logic level representing a vacant state. Occupancy determinations can be dependent on a number of settings of the occupancy sensor, which can be preconfigured or configured through physical interfaces on the occupancy sensor 104a or remotely via a graphic user interface (GUI) or remote control. Additionally, sensitivity settings can be determined according to one or more factors such as time event, including time of day, day of week or month of year, a scheduled event, the current occupancy state of the monitored area, or the occupancy state of another area. The sensitivity setting can be determined either locally at the occupancy sensor or at a network device and transmitted to the occupancy sensor. For example, the timeout period of the occupancy sensor can be set. Additionally, the sensitivity of the individual sensors can be set. Finally, the physical direction of the sensors operational range can be set by altering a mask of the occupancy sensor.

Occupancy sensor 104a may be configured to operate in various modes, including an "Occupancy" mode or a "Vacancy" mode. For example, the sensor 104a may contain a dedicated button, or a button combination, configured for toggling the sensor 104a between the "Occupancy" mode and the "Vacancy" mode.

In the "Occupancy" mode, lights automatically turn on when the room is occupied and automatically turn off when the room is vacant in response to the occupancy sensor 104a. Particularly, in the "Occupancy" mode, the occupancy sensor 104a may transmit a "Room_Occupied_With_Action", "Room_Occupied_No_Action", and "Room_Vacant" signals to the load controller 102. During the "Occupancy" mode, the lights are generally off. The "Room_Occupied_With_Action" signal will indicate to the load controller 102 to turn lights on when the occupancy sensor 104a detects that the room is occupied. After transmitting the "Room_Occupied_With_Action" signal, the occupancy sensor 104a may periodically continue to determine whether the room is occupied or not. If the room is occupied, the occupancy sensor 104a may report the status of the room periodically (e.g., every 3 hours) while it remains occupied to the load controller 102 by sending a "Room_Occupied_No_Action" signal. This will inform the load controller 102 that the room is still occupied and that the sensor has not failed if not heard in 3 hours. The load controller 102 may record the signal with no further action. The "Room_Vacant" signal will indicate to the load controller 102 to turn lights off when the occupancy sensor 104a detects that the room has been vacant for a predetermined period of time.

In the "Vacancy" mode, lights must be manually turned on via the lighting control device 103 and automatically turn off when the room is vacated in response to the occupancy sensor 104a. In the "Vacancy" mode, the occupancy sensor 104a may transmit a "Room_Occupied_With_Action", "Room_Occupied_No_Action", and "Room_Vacant" signals. During the "Vacancy" mode, the lights are generally off and must be turned on manually via the lighting control deice 103 by someone walking into the room. Therefore, the occupancy sensor 104a generally does not transmit a "Room_Occupied_With_Action" signal upon determining that the room is occupied. Instead, the occupancy sensor 104a transmits a "Room_Occupied_No_Action" signal to simply inform the load controller 102 that the room is occupied, without triggering the lights to turn on automatically. After the lights have been turned on manually, the occupancy sensor 104a is configured to detect vacancy—i.e., whether the room has been vacated. Once the occupancy sensor 104a determines that the room is vacant for a predetermined period of time, it sends a "Room_Vacant" signal to trigger the lights to turn off. The occupancy sensor 104a may transmit a "Room_Occupied_With_Action" signal in limited circumstances to provide a means to turn lights back on should they turn off falsely while people are still in the room. For example, the "Room_Occupied_With_Action" signal can be transmitted when occupancy is detected within a brief period of time (e.g., 30 seconds) of a room becoming vacant. After 30 seconds, the "Room_Occupied_No_Action" signal is sent.

Sensors 104a-b may also comprise a daylight sensor 104b, also called a photosensor, configured for detecting and measuring light intensities in a room. A light sensor 104b can comprise a dual-loop photosensor having two internal photocells with 0-65535 lux (0-6089 foot-candles) light sensing, one for open-loop daylight sensing and one for closed-loop ambient light sensing to measures light intensity from natural daylight and ambient light sources. In an illustrative embodiment, daylight sensor 104b may comprise similar configuration as the GLS-LDL-EX-BATT, Battery-Powered Photosensor with infiNET EX®, available from Crestron Electronics, Inc. of Rockleigh, N.J.

The daylight sensor 104b may communicate the detected light intensity to the load controller 102. Detected light intensities can be used in operation of the lighting control system 100, for example, for daylight harvesting to effectively cut energy costs. The load controller 102 may reduce its output to dim the lighting load 106 based on the sunlight level reported by the daylight sensor 104b.

The lighting control system 100 may further comprise other types of sensors. In various embodiments, sensors 104a-b can comprise one or more of light sensors, infrared sensors, photosensors, ultrasonic sensors, various motion sensors, occupancy sensors, proximity sensors, sound sensors, microphones, ambient temperature sensors, or the like.

The lighting control system 100 further comprises a load controller 102 installed in the room 101. The load controller 102 receives messages from the battery powered lighting control devices 103 and sensors 104a-b in the lighting control system 100 to control its associated lighting load 106. Although a single load controller 102 is illustrated, the lighting control system 100 may comprise a plurality of load controllers 102 connected to respective lighting loads 106 within room 101. The one or more load controllers 102 may receive control messages from one or a plurality of control devices 103 and sensors 104a-b. In another embodiment, the load controller 102 may be grouped with particular control devices 103 and sensors 104a-b located within room 101.

The load controller 102 may be mounted to a junction box 105 in the ceiling via a conduit knockout and may comprise a plurality of wire leads 111 extending into the junction box 105. The load controller 102 may comprise a hot wire and a neutral wire connected via a voltage line 112 to an alternating current (AC) power source, such as an AC mains power source, to receive electric AC power signal. In an embodiment, the AC power source may comprise 120 Volt (V) 60 Hertz (Hz) AC mains residential power supply. In other embodiments, the AC power source may supply power at a different voltage or frequency. For example, in another embodiment, the AC power source may supply 220V 50 Hz AC mains power supply. The load controller 102 may be further connected to a lighting load 106 via load line 113 to control the lighting load 106 in response to messages received from the battery powered lighting control devices 103 and sensors 104a-b.

In an alternative embodiment, instead of using a hard wired configuration, the load controller 102 may comprise a plug-in configuration. The load controller 102 may comprise a plug for connection to a wall receptacle to receive electric AC power signal from an AC power source. Additionally, the load controller 102 may comprise a receptacle for receiving a plug from a lighting load 106.

Figure 3:
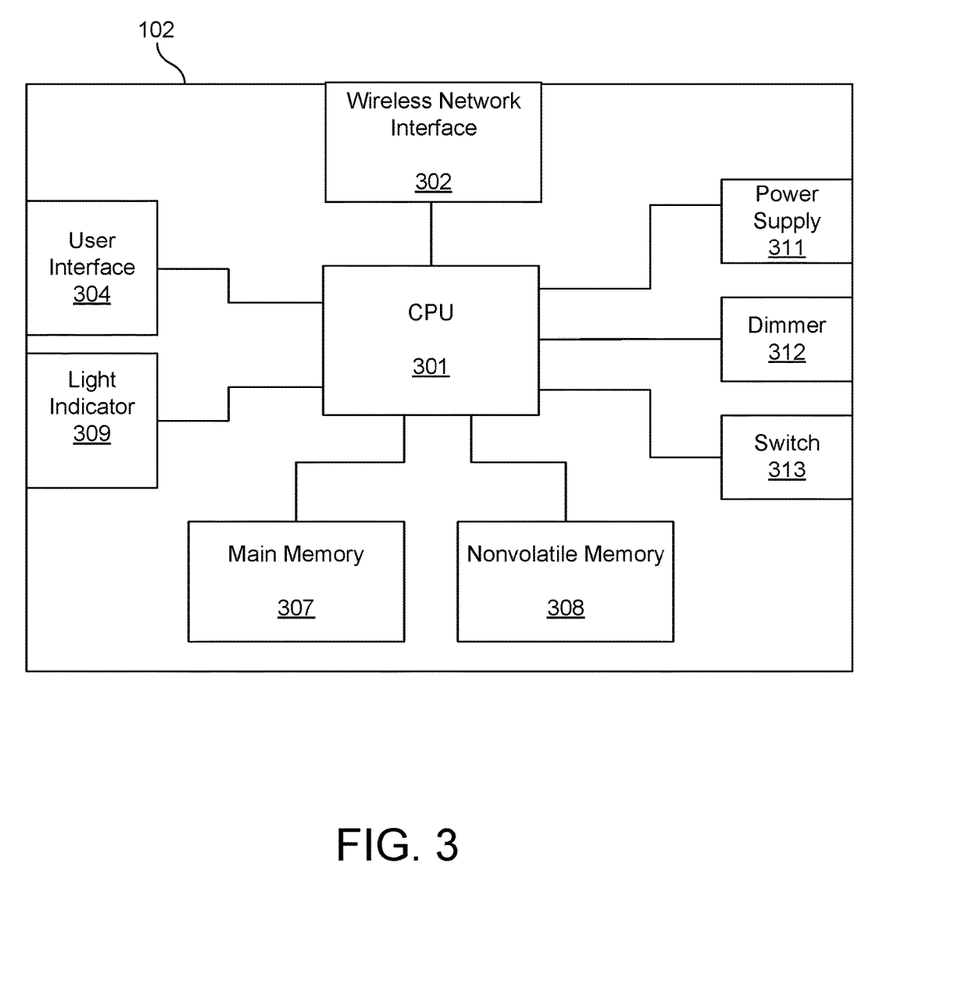
FIG. 3 illustrates a block diagram of a load controller according to an illustrative embodiment.

FIG. 3 is an illustrative block diagram of a load controller 102. The load controller 102 may include various circuit components configured for receiving commands and transmitting commands wirelessly to various in-room devices, such as the lighting control devices 103 and sensors 104a-b. The load controller 102 may comprise a power supply 311 connected to the voltage line 112 for receiving an electric AC power signal from an AC mains power source. The power supply 311 may comprise circuit components configured for converting the incoming AC power signal to a DC power signal. For example, the power supply 311 may comprise a bridge rectifier that rectifies the AC voltage signal and converts it into a rectified DC voltage signal. The bridge rectifier may comprise four or more diodes in a bridge circuit configuration which provides the same polarity output for either polarity input of the AC signal. The power supply 311 may also comprise a voltage regulator configured for maintaining a substantially constant voltage level to stabilize the DC voltage signal used by the circuit elements of the load controller 102.

The load controller 102 may comprise a user interface 304, such one or more buttons, configured for commanding the load controller 102 to enter into a test mode, a setup mode, or the like. The load controller 102 may further comprise status light indicators 309, such as one or more LEDs, for use during setup, maintenance, troubleshooting, or the like.

The load controller 102 can further comprise a CPU 301. CPU 301 can represent one or more microprocessors, and the microprocessors can be "general purpose" microprocessors, a combination of general and special purpose microprocessors, or ASICs. Additionally, or alternatively, the CPU 301 can include one or more RISC processors, video processors, or related chip sets. The CPU 301 can provide processing capability to execute an operating system, run various applications, and/or provide processing for one or more of the techniques and functions described herein. CPU 301 can process various commands and perform operations in response to messages received from in-room devices, such as the lighting control devices 103 and sensors 104a-b, to control the lighting load 106.

The load controller 102 can further include a main memory 307 and a nonvolatile memory 308. Main memory 307 can be communicably coupled to the CPU 301, which can store data and executable code. The main memory 307 can represent volatile memory such as RAM, but can also include nonvolatile memory, such as ROM or Flash memory. In buffering or caching data related to operations of the CPU 301, the main memory 307 can store data associated with applications running on the control processor 301. The nonvolatile memory 308 can represent any suitable nonvolatile storage medium, such as a hard disk drive or nonvolatile memory, such as Flash memory. Being well-suited to long-term storage, the nonvolatile storage 308 can store data files, software for implementing the functions on the control processor 301, and wireless connection information to establish the wireless network 110.

The load controller 102 may further comprise a wireless network interface 302 configured for bidirectional wireless communication with other electronic devices, such as the lighting control devices 103 and sensors 104a-b, over the wireless network 110. The wireless network interface 302 may comprise an RF transceiver configured for bidirectional wireless communication using wireless communication protocols, such as the ZigBee® protocol, the infiNET EX® protocol from Crestron Electronics, Inc. of Rockleigh, N.J., or the like.

The load controller 102 may be a dimming load controller and/or a switching load controller. The load controller may comprise a switch 313 configured for switching a connected lighting load 106 on or off. According to one embodiment, switch 313 may comprise an electromechanical relay configured for switching the lighting load 106 on or off. An electromechanical relay may use an electromagnet to mechanically operate a switch. In another embodiment, a solid-state relay (SSR) may be used to switch the lighting load 106 on or off. The SSR may comprise semiconductor devices, such as thyristors (e.g., TRIAC) and transistors, to switch currents up or down.

In addition, or alternatively, the load controller 102 may comprise a dimmer 312 configured for providing a dimmed voltage output to a connected lighting load 106. According to an embodiment, the dimmer 312 may comprise a 0-10V DC dimmer to provide a dimmed voltage output to an LED lighting load, a fluorescent lighting load, or the like. In one embodiment, the dimmer 312 may comprise the sinking and sourcing dimmer circuit disclosed in U.S. patent application Ser. No. 15/336,381, filed Oct. 27, 2016, and titled "Dimmer Configured for Providing Sinking and Sourcing, Current Outputs," the entire contents of which are hereby incorporated by reference.

The various in-room devices, including the load controller 102, lighting control device 103, and sensors 104a-b, intercommunicate with each other using the wireless network 110. In one embodiment, wireless network 110 can comprise one or more wireless personal area networks (WPANs). Communication protocols govern the operation of the wireless network 110 of the lighting control system 100 by governing network formation, communication, interferences, and other operational characteristics. For example, one such protocol is the ZigBee® protocol from the ZigBee Alliance. Another wireless communication protocol is the infiNET EX® protocol from Crestron Electronics, Inc. of Rockleigh, N.J. infiNET EX® is an extremely reliable and affordable protocol that is employed by 2-way wireless wall box dimmers and switches, lamp dimmers and switches, plus thermostats and keypads, and other sensors and control devices. infiNET EX® utilizes 16 channels on an embedded 2.4 GHz radio frequency (RF) wireless network, providing more stable, reliable wireless communications over larger areas without the need for additional control wiring.

In an embodiment, the wireless network 110 of the lighting control system 100 between the load controller 102, lighting control device 103, and sensors 104a-b is automatically formed upon installation during a wireless network initialization process. The in-room devices can communicate directly with each other via a pairing process—e.g., tapping buttons on the load controller 102, lighting control device 103, and sensors 104a-b links these devices together to form the in-room wireless network 110. According to an embodiment, the load controller 102 in the room 101, or one of the load controllers 102 in the room 101 if there is more than one, may act as a router and can take on role of the network coordinator configured for forming the in-room wireless network 110. The load controller 102 may contain a button which commands the load controller 102 to form the network 110. In response, the load controller 102 may pick the best channel and select a random personal area network (PAN) identification number (ID) and establish the network 110. The load controller 102 may then permit the other in-room devices 103 and/or 104a-b to join the network 110.

To join the network 110, the other in-room devices 103 and/or 104a-b can comprise dedicated buttons, or button combinations, configured for commanding the devices to join the network 110. In response, the devices will initiate a network scan to search for best available network. If a network is available and permits devices to join it, the in-room device will perform an association to that network, for example by sending a join request to the load controller 102 and receiving a join confirmation message from the load controller 102. According to an embodiment, the in-room device will undergo a security procedure for authentication. If authentication is successful, the in-room device can start acting as an end device and the load controller 102 may act as a network manager.

After the network formation, the lighting control system 100 can respond to sunlight levels, occupancy information, button presses and any integration points through the load controller 102.

Figure 4:
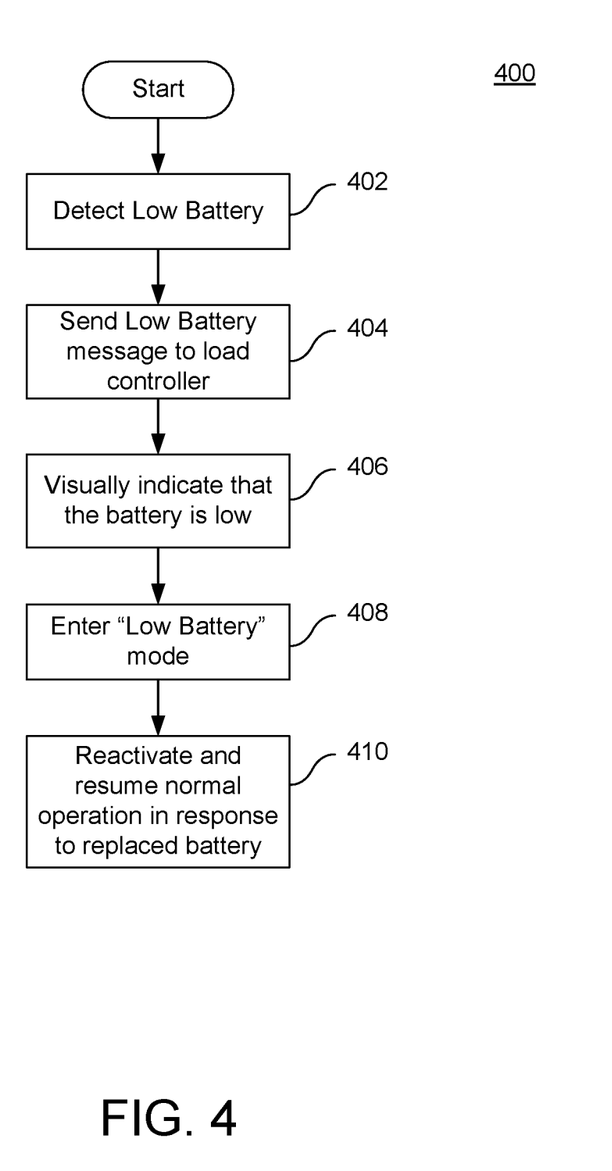
FIG. 4 shows a flowchart illustrating an operation of the battery powered lighting control device when it's battery is low according to an illustrative embodiment.

FIG. 4 is a flowchart 400 illustrating the operation of the battery powered lighting control device 103 when it's battery 210 is low, in accordance with an illustrative embodiment of the invention. In step 402, the battery powered lighting control device 103 detects that its battery 210 is low. The low battery level is detected by reading the battery voltage level and determining whether the battery voltage level is below a predetermined low battery threshold. The low battery threshold may be set to give plenty of headroom for at least one RF transmission. For example, the low battery threshold may be around 2.3V. According to an embodiment, the battery powered lighting control device 103 may check the battery voltage level after each button action, which includes an RF transmission.

In step 404, if the detected battery level is below the low battery threshold, the lighting control device 103 sends a "Low Battery" message to the load controller 102. In addition, in step 406, the light indicator 209 of the lighting control device 103 may visually indicate to the user that the battery 210 is low. For example, the LED 108 of the lighting control device 103 may blink red for around 0.5 seconds. In another embodiment, the LED 108 of the lighting control device 103 may stay red or may blink red when a user presses on a button of the lighting control device 103.

Then, in step 408, the lighting control device 103 is configured enter into a "Low Battery" mode where it ceases transmitting messages to the load controller 102. According to one embodiment, the lighting control device 103 may completely shut down immediately after sending the "Low Battery" message and having its LED blink. In another embodiment, the lighting control device 103 is configured to disable one or more of its operations such that it cannot transmit messages to the load controller 102. According to an embodiment, since it is not completely shut down, the lighting control device 103 may continue to visually indicate to the user via the light indicator 209 that its battery 210 is low, until the battery 210 completely dies. For example, the lighting control device 103 may turn off its wireless network interface 202, turn off its user interface 204, prevent the CPU 201 from initiating any messages to the load controller 102 (e.g., in response to the user interface 204), or the like, or any combinations thereof.

Then the battery 210 is replaced in step 410, causing the lighting control device 103 to reboot and power back up. Once it is powered back up, the lighting control device 103 may check whether it was part of any network by reading the state of the nonvolatile memory 208. It may read the stored network information, discover the network manager (i.e., the load controller 102), and rejoin the network. Once reactivated, the lighting control device 103 may resume its normal operation.

Figure 5:
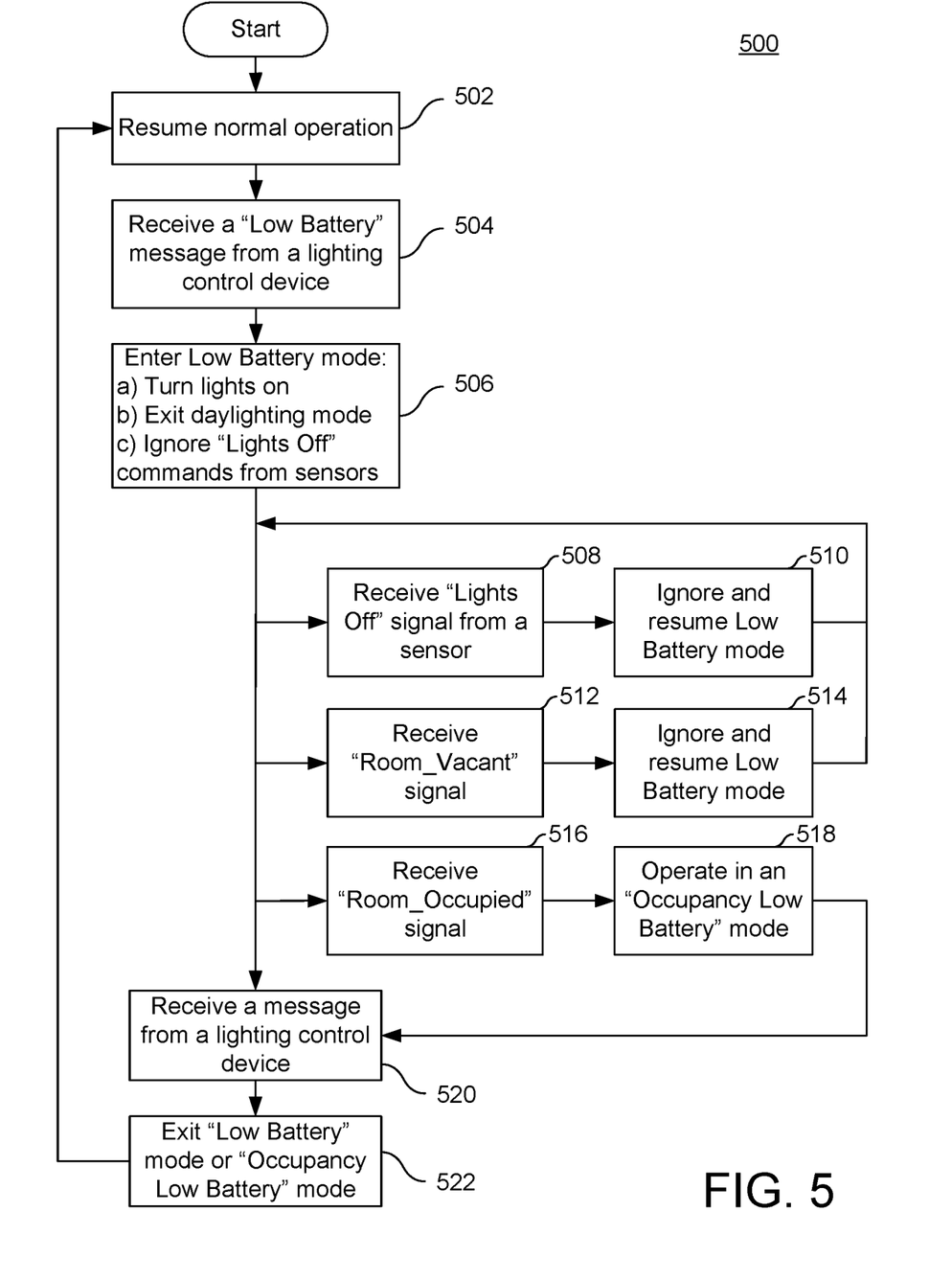
FIG. 5 shows a flowchart illustrating an operation of the load controller in a low battery mode according to an illustrative embodiment.

FIG. 5 is a flowchart 500 illustrating the operation of the load controller 102 in a low battery mode, in accordance with an illustrative embodiment of the invention. In step 502, the load controller 102 is in normal operation. In step 504, the load controller receives a "Low Battery" message from at least one lighting control device 103.

In step 506, the load controller 102 enters a "Low Battery" mode where the load controller 102 does not expect that the lighting control system 100 contains any operational lighting control devices 103 capable of turning the lights on. In the "Low Battery" mode, the load controller 102 is configured to turn on of all its lighting loads 106 and maintain them turned on. Accordingly, the load controller 102 ensures that room occupants are not left in the dark without any means to turn the lights back on.

If the room 101 contains a daylight sensor 104b configured for operating the lighting control system 100 in a daylight mode, the load controller 102 exits the daylight mode. According various embodiments, it may ignore any messages received from the daylight sensor 104b, transmit a message to the daylight sensor 104b to exit the daylight mode and cease transmitting messages to the load controller 102, or the like.

Additionally, in the "Low Battery" mode, the load controller 102 ignores any "Lights Off" commands received from any sensors 104a-b. If the load controller 102 receives a "Lights Off" signal from a sensor in step 508, the load controller 102 ignores that command and resumes the "Low Battery" mode in step 510.

If the room 101 contains any occupancy sensors 104b, and the load controller 102 receives a "Room_Vacant" signal from an occupancy sensor 104b indicating to turn lights off, the load controller 102 ignores that command and resumes the "Low Battery" mode in step 514. However, if in step 516 the load controller 102 receives a "Room_Occupied" signal from an occupancy sensor 104b, whether with action or no action, then the load controller 102 interprets this message to indicate that there are means in the room 101 to indicate to the load controller 102 to turn the lights on. Therefore, in step 518 the load controller 102 enters an "Occupancy Low Battery" mode, which does not necessarily require an operation of a keypad. In the "Occupancy Low Battery" mode, the load controller 102 sends a command to the occupancy sensor 104b to operate in an "Occupancy" mode, as discussed above. If the occupancy sensor 104b previously operated according to the "Vacancy" mode, it will toggle to operate in an "Occupancy" mode in response to the command received from the load controller 102. Particularly, as described above, in a "Vacancy" mode, the lights have to be turned on manually at the lighting control device 103. The load controller 102 forces the occupancy sensor 104b to temporarily operate in an "Occupancy" mode where the lights can turn on automatically in response to an occupancy signal without an operation of a lighting control device 103.

If anytime during the "Low Battery" mode operation or "Occupancy Low Battery" mode operation, the load controller 102 receives any message from a lighting control device 103 in step 520, the load controller 102 will then exit the "Low Battery" mode or the "Occupancy Low Battery" mode in step 522. The load controller 102 will exit the "Low Battery" or "Occupancy Low Battery" modes upon receiving a message from any one of the lighting control devices 103 installed in room 101.

For example, the room 101 may contain a single lighting control device 103, which upon battery 210 replacement, may send a message to the load controller 102 causing it to exit the "Low Battery" mode. In another embodiment, the room 101 may contain a plurality of lighting control device 103. One of the lighting control device 103 may have a low battery 210 and force the load controller 102 to enter the "Low Battery" mode. Although the load controller 102 only receives a message from a single lighting control device 103, the load controller 102 assumes that there is no other device to turn the lights on. Then, the load controller 102 may receive a message from another lighting control device 103 installed in the room 101, forcing it to exit the "Low Battery" mode.

The message sent from the lighting control device 103, which causes the load controller 102 to exit the "Low Battery" mode or the "Occupancy Low Battery" mode, may be any message indicating to the load controller 102 that there is an operational lighting control device 103 available in room 101. For example, the message may indicate that the battery 210 of the lighting control device 103 is no longer low. In another embodiment, the message from the lighting control device 103 may comprise a control command, for example indicating to turn the lighting load 106 on or off. In yet another embodiment, the message may be a request from the lighting control device 103 to rejoin the network 110 and/or a confirmation that the lighting control device 103 has joined the network 110.

The load controller 102 may then resume its normal operation in step 502.

According to an embodiment, the operation of the lighting control system 100 described above permits the load controller 102 to control the lighting load 106 installed in the room 101 without any programming, while at the same time ensuring that there is always means to turn lights on in room 101. The load controller 102 does not need to know the configuration of the lighting control system 100, or the type or number of devices installed in the room 101.

INDUSTRIAL APPLICABILITY

The disclosed embodiments provide a system, software, and a method for a scalable building control system that can be scaled up from a single room control to an entire building control. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:

1. A lighting control system installed in a room comprising:
    at least one battery powered lighting control device, each comprising:
        a user interface adapted to receive control commands from a user;
        a first wireless network interface adapted to transmit messages over a wireless network; and
        a first processor adapted to detect a low battery level, wherein upon detecting the low battery level the first processor transmits a low battery message and enters into a low battery mode during which the at least one lighting control device ceases transmitting any messages until the battery is replaced;
    a load controller connected to a power source and to a lighting load to control an operation of the lighting load, wherein the load controller comprises:
        a second wireless network interface adapted to receive messages over the wireless network; and
        a second processor adapted to receive the low battery message from the at least one lighting control device, wherein upon receiving the low battery message the second processor enters into a low battery mode during which the load controller maintains the lighting load turned on, and wherein upon receiving a subsequent message from at least one lighting control device the second processor exits the low battery mode and resumes normal operation.

2. The lighting control system of claim 1, wherein the load controller is hard wired to the power source and to the lighting load.

3. The lighting control system of claim 1, wherein the load controller comprises a receptacle for receiving a plug of the lighting load.

4. The lighting control system of claim 1, wherein the load controller comprises a switch adapted to turn the lighting load on or off.

5. The lighting control system of claim 4, wherein the switch comprises an electromechanical relay, a solid-state relay, or a combination thereof.

6. The lighting control system of claim 1, wherein the load controller comprises a dimmer adapted to provide a dimmed voltage output to the lighting load.

7. The lighting control system of claim 1, wherein the first processor is adapted to detect the low battery level by reading a battery voltage level of the battery and determining whether the battery voltage level is below a predetermined low battery threshold.

8. The lighting control system of claim 7, wherein the low battery threshold comprises a value that exceeds a voltage level required for at least one wireless transmission over the wireless network.

9. The lighting control system of claim 1, wherein during the low battery mode of the lighting control device, the at least one lighting control device shuts down.

10. The lighting control system of claim 1, wherein during the low battery mode of the lighting control device, the at least one lighting control device disables one or more of its operations such that it cannot transmit messages to the load controller.

11. The lighting control system of claim 10, wherein during the low battery mode of the lighting control device, the at least one lighting control device turns off its wireless network interface.

12. The lighting control system of claim 10, wherein during the low battery mode of the lighting control device, the at least one lighting control device turns off its user interface.

13. The lighting control system of claim 10, wherein during the low battery mode of the lighting control device, the first processor of the at least one lighting control device does not initiate any messages to the load controller.

14. The lighting control system of claim 1,
    wherein the at least one lighting control device comprises a status light indicator;
    wherein during the low battery mode of the lighting control device, the at least one lighting control device visually indicates via the light indicator that its battery level is low.

15. The lighting control system of claim 1 further comprising at least one sensor, wherein during the low battery mode of the load controller, the load controller ignores any messages from the at least one senor to turn the lights off.

16. The lighting control system of claim 1 further comprising at least one daylight sensor adapted to detect and measure light intensities in the room and transmit the measured light intensities to the load controller, wherein during the low battery mode of the load controller the load controller ignores any message received from the daylight sensor.

17. The lighting control system of claim 1,
    wherein the load controller is adapted to operate in a daylighting mode by dimming its output to dim the lighting load based on sunlight levels reported by a daylight sensor;

wherein during the low battery mode of the load controller, the load controller exits the daylighting mode.

18. The lighting control system of claim 1 further comprising an occupancy sensor adapted to detect an occupancy state of the room and transmit a room occupied signal when the room is occupied and a room vacant signal when the room is vacant.

19. The lighting control system of claim 18, wherein during the low battery mode of the load controller, the load controller ignores a room vacant signal received from the occupancy sensor.

20. The lighting control system of claim 18, wherein during the low battery mode of the load controller, upon receipt of the room occupied signal the load controller enters into an occupancy low battery mode and sends a command to the occupancy sensor to operate in an occupancy mode, wherein during the occupancy low battery mode the load controller turns the lighting load on upon receiving the room occupied signal and turns the lighting load off upon receiving the room vacant signal.

21. The lighting control system of claim 1 further comprising:
 an occupancy sensor adapted to detect an occupancy state of the room, wherein the occupancy sensor is adapted to operate in an occupancy mode or a vacancy mode, wherein during the occupancy mode the occupancy sensor transmits a room occupied action signal when the room becomes occupied and a room vacant signal when the room becomes vacant, wherein during the vacancy mode the occupancy sensor transmits a room occupied no action signal when the room becomes occupied and a room vacant signal when the room becomes vacant;
 wherein during the normal operation of the load controller, the load controller is adapted to turn the lighting load on upon receipt of the room occupied action signal, turn the lighting load off upon receipt of the room vacant signal, and not change the operation of the lighting load upon receipt of the room occupied no action signal;
 wherein during the low battery mode of the load controller, upon receipt of the room occupied action signal or the room occupied no action signal, the load controller enters into an occupancy low battery mode and sends a command to the occupancy sensor to operate in an occupancy mode;
 wherein in response to the command to operate in an occupancy mode, the occupancy sensor toggles to operate in the occupancy mode.

22. The lighting control system of claim 21, wherein during the low battery mode of the load controller, the load controller ignores the room vacant signal received from the occupancy sensor.

23. The lighting control system of claim 21, wherein during the occupancy low battery mode, the load controller is adapted to turn the lighting load on upon receipt of the room occupied action signal, turn the lighting load off upon receipt of the room vacant signal, and not change the operation of the lighting load upon receipt of the room occupied no action signal.

24. The lighting control system of claim 21, wherein the load controller exits the occupancy low battery mode and resumes normal operation upon receipt of the subsequent message from the at least one lighting control device.

25. The lighting control system of claim 1, wherein the subsequent message from the at least one lighting control device that causes the load controller to exit the low battery mode comprises a message indicating to the load controller that there is a least one operational lighting control device.

26. The lighting control system of claim 1, wherein the subsequent message from the at least one lighting control device that causes the load controller to exit the low battery mode comprises at least one selected from a group consisting of a message indicating that the battery of the at least one lighting control device is no longer low, a control command, a request from the at least one lighting control device to rejoin the network, a confirmation that the at least one lighting control device has joined the network, and any combinations thereof.

27. The lighting control system of claim 1, wherein the lighting control system comprises a plurality of lighting control devices, wherein the load controller enters the low battery mode upon receiving the low battery message from one of the plurality of lighting control devices and exits the low battery mode upon receiving the subsequent message from any one of the plurality of lighting control devices.

28. A load controller installed in a room comprising:
 a power supply connected to a power source;
 a switch connected to the lighting load;
 a wireless network interface adapted to wirelessly communicate over a wireless network with at least one battery powered lighting control device; and
 at least one processor adapted to control an operation of the lighting load in response to receiving messages from the at least one lighting control device, wherein the at least one processor is adapted to receive low battery message from the at least one lighting control device indicating that the at least one lighting control device detected a low battery level, wherein the at least one lighting control device is adapted to cease transmitting any messages to the load controller until its battery is replaced, wherein upon receiving the low battery message the at least one processor enters into a low battery mode during which the load controller maintains the lighting load turned on, and wherein upon receiving a subsequent message from at least one lighting control device the at least one processor exits the low battery mode and resumes normal operation.

29. A method of operation of a load controller comprising the steps of:
 controlling an operation of a lighting load in response to receiving messages from at least one battery operated lighting control device over a wireless network;
 receiving a low battery message from the at least one lighting control device indicating that the at least one lighting control device detected a low battery level, wherein the at least one lighting control device is configured for ceasing transmitting any messages to the load controller until its battery is replaced;
 entering into a low battery mode during which the load controller maintains the lighting load turned on; and
 exiting the low battery mode and resuming normal operation upon receipt of a message from the at least one lighting control device.

* * * * *